United States Patent [19]
Bec

[11] Patent Number: 5,420,840
[45] Date of Patent: May 30, 1995

[54] SEPARATION TYPE MONO BLOCK OPTICAL HEAD WITH TRACKING CONTROL ACHIEVED BY A MOVEABLE MIRROR

[75] Inventor: Daniel Bec, Villeneuve Tolosane, France

[73] Assignee: Art Tech Gigadisc "ATG", Toulouse, France

[21] Appl. No.: 977,622

[22] Filed: Nov. 17, 1992

[30] Foreign Application Priority Data

Nov. 19, 1991 [FR] France .................. 91 14223

[51] Int. Cl.[6] .............................. G11B 7/135
[52] U.S. Cl. ................. 369/44.14; 369/119; 369/44.17
[58] Field of Search ............. 369/44.21, 44.14, 44.35, 369/119, 44.28, 44.17, 112

[56] References Cited

U.S. PATENT DOCUMENTS

| | | | |
|---|---|---|---|
| 4,942,564 | 7/1990 | Hofer et al. | 369/44.21 X |
| 4,958,335 | 9/1990 | Takeda et al. | 369/44.14 |
| 4,977,552 | 12/1990 | Gotoh | 369/44.14 |
| 5,038,333 | 8/1991 | Chow et al. | 369/44.28 |
| 5,140,572 | 8/1992 | Kibune et al. | 369/44.14 |

FOREIGN PATENT DOCUMENTS

| | | |
|---|---|---|
| 0088662 | 9/1983 | European Pat. Off. . |
| 0341820 | 11/1989 | European Pat. Off. . |
| 0406054 | 1/1991 | European Pat. Off. . |
| 61-194647 | 8/1986 | Japan . |
| 2076135 | 3/1990 | Japan . |
| 2216625 | 8/1990 | Japan . |
| 2294942 | 12/1990 | Japan . |

OTHER PUBLICATIONS

Attached list of copending U.S. applications of the inventors (1 page).

Primary Examiner—Aristotelis Psitos
Assistant Examiner—Duncan Wilkinson
Attorney, Agent, or Firm—Roland Plottel

[57] ABSTRACT

A device for accessing and following tracks on a surface of mobile media on which data is optically readable and writable by a laser beam. The device includes at least one optical head made of a rigid carriage which enables a laser beam (F) to access the track. A lens is rigidly linked to the rigid carriage (3) and focuses the laser beam on the surface of the mobile data medium. A return mirror is rigidly linked to the rigid carriage to direct the laser beam towards the lens. At least one motor coil allows movements of the carriage to focus the laser beam. A mirror which is not fixed to the optical head allows the laser beam to be directed towards the optical head, and a motor coil allows the mirror to pivot. Also means are provided for detecting and correcting any decentering of the beam in relation to the axis perpendicular to the plane of a pupil of the lens and passing through its center. The correction is applied along a direction defined by the axis, perpendicular to said axis and contained in the plane perpendicular to the plane of the pupil, and the center of the return mirror, and the center of the mirror which allows the laser beam to be directed towards the optical head. The device is applicable to readers and recorders of mobile media containing optically readable or recordable data.

12 Claims, 7 Drawing Sheets

SEPARATION TYPE MONO BLOCK OPTICAL HEAD WITH TRACKING CONTROL ACHIEVED BY A MOVEABLE MIRROR

BACKGROUND OF THE INVENTION

The present invention concerns devices for access and tracking of tracks on the surface of mobile data media readable and/or writable optically by a laser beam.

In the case of a medium in the form of a disk, which shall be taken as the example for the rest of the account, the data is recorded along tracks in the form of either a single spiral extending from the center to the edge of the disk, or a series of concentric circles.

During reading or recording, the disk is in motion. Its movement is rotational about an axis which is perpendicular to the surface of the disk and passes through its center.

Generally, a reading and/or recording device includes means which allow the laser beam to access the track which is to be read and/or written and means to assure the tracking. Tracking is carried out by monitoring and correcting firstly the focussing of the luminous spot that the laser beam makes on the surface of the disk and secondly the radial positioning error of this spot in relation to the axis of the track.

Thus, a classical device for access and tracking includes among other things an access carriage??, a focussing lens and a radial tracking mirror. These elements make up the optical head which is known as the "mobile head". When the device for reading and recording is in operation, the focussing lens and the radial tracking mirror follow a track, whatever the position of the optical head. When the optical head moves the radial tracking stops but the focussing continues. During an access, the access carriage allows firstly the focussing lens and the radial tracking mirror to be positioned above the track, and secondly, the radial tracking mirror is activated to adjust the tracking.

To carry out the access and radial tracking operations, a device in which the motor coil assures both access and radial tracking has been described in the French Patent N° 82 03425.

According to this patent, the optical head is attached to and slides on a guide rail. Means for flexible links between the gliding elements and the optical head are provided in order to obtain a good operation. The use of simple gliding systems does not enable satisfactory tracking to be obtained. Furthermore, in the French Patent N° 82 03425, the focussing lens and its associated coil are linked to the rest of the optical head, which also contains the radial tracking mirror and the access coil, by means of a flexible link in order to avoid the focussing operation being accompanied with a diaphragm effect.

Such a structure for a device for access and control increases the mass of the mobile head and therefore the mass of counterweight necessary to balance it, which has as the main disadvantage of increasing the weight of the head and thereby limiting the speed of access.

By carrying out studies on devices for access and control for an optical disk, the applicant noticed that by using a monobloc structure including the optical head and the two coils for the motor-devices it is possible as is described in French Patent N° 89 08800 to eliminate the means of flexible linkage while maintaining a high level of precision and thus to lighten the mobile head and enable faster access to the tracks.

However, the fact that the optical head and the two coils for the motor-coils are solidly linked is a disadvantage in some cases. When the control device is activated in order to correct the focussing of the laser beam, its movement causes a slight decentering of the beam on the pupil of the focussing lens. For example, when the mobile data medium used has an insufficiently flat surface, this decentering results in deformation and enlargement of the focussing spot accompanied by a reduction in the density of the optical power of this spot. This enlargement may be enough to prevent the laser beam from correctly reading and/or writing data.

SUMMARY OF THE INVENTION

The invention does not present this disadvantage.

The object of the present invention is a device for accessing and following tracks on the surface of mobile media containing data optically readable and/or recordable by a laser beam, the said device including at least one optical head made up of a rigid carriage which enables the laser beam to access the reading and/or writing track, of a lens rigidly linked to the rigid carriage and intended to focus the laser beam on the surface of the mobile data medium, of a return mirror linked rigidly to the rigid carriage and intended to direct the laser beam towards the lens, of at least one motor coil which allows movements of the carriage intended to focus the laser beam, and a mirror not fixed to the optical head and which allows the laser beam to be directed towards the optical head as well as a motor coil allowing said mirror to pivot, wherein it includes means for detecting and correcting any decentering of the beam in relation to the axis perpendicular to the plane of the pupil of the lens and passing through its center, the correction being applied along the direction defined by the axis perpendicular to the said axis and contained in the plane perpendicular to the plane of the pupil and containing the center of the return mirror and the center of the mirror which allows the laser beam to be directed towards the optical head.

One advantage of the invention is that the mobility of the reading/recording head is equal to that of the device described in the French Patent N° 89 08800.

The presence of means of detection of the decentering of the laser beam enables the correction of the deformation of the focus spot which can appear in devices according to previous methods.

BRIEF DESCRIPTION OF THE DRAWINGS

Other characteristics and advantages of the present invention will become apparent on reading the description of a preferred embodiment, which makes reference to the attached drawings which represent.

On all the figures, the same references indicate the same elements.

In order to simplify the drawings, the laser beams have been drawn symbolically without taking diffraction into account. Therefore, they converge on a single point on the said figures. A specialist knows that in reality a focussed laser beam always covers a surface with finite dimensions. In order to read information on optical disks, this surface of the laser beam has a transversal dimension greater than that of the pre-engraved marks to be read.

DESCRIPTION OF THE INVENTION

Figure 1:
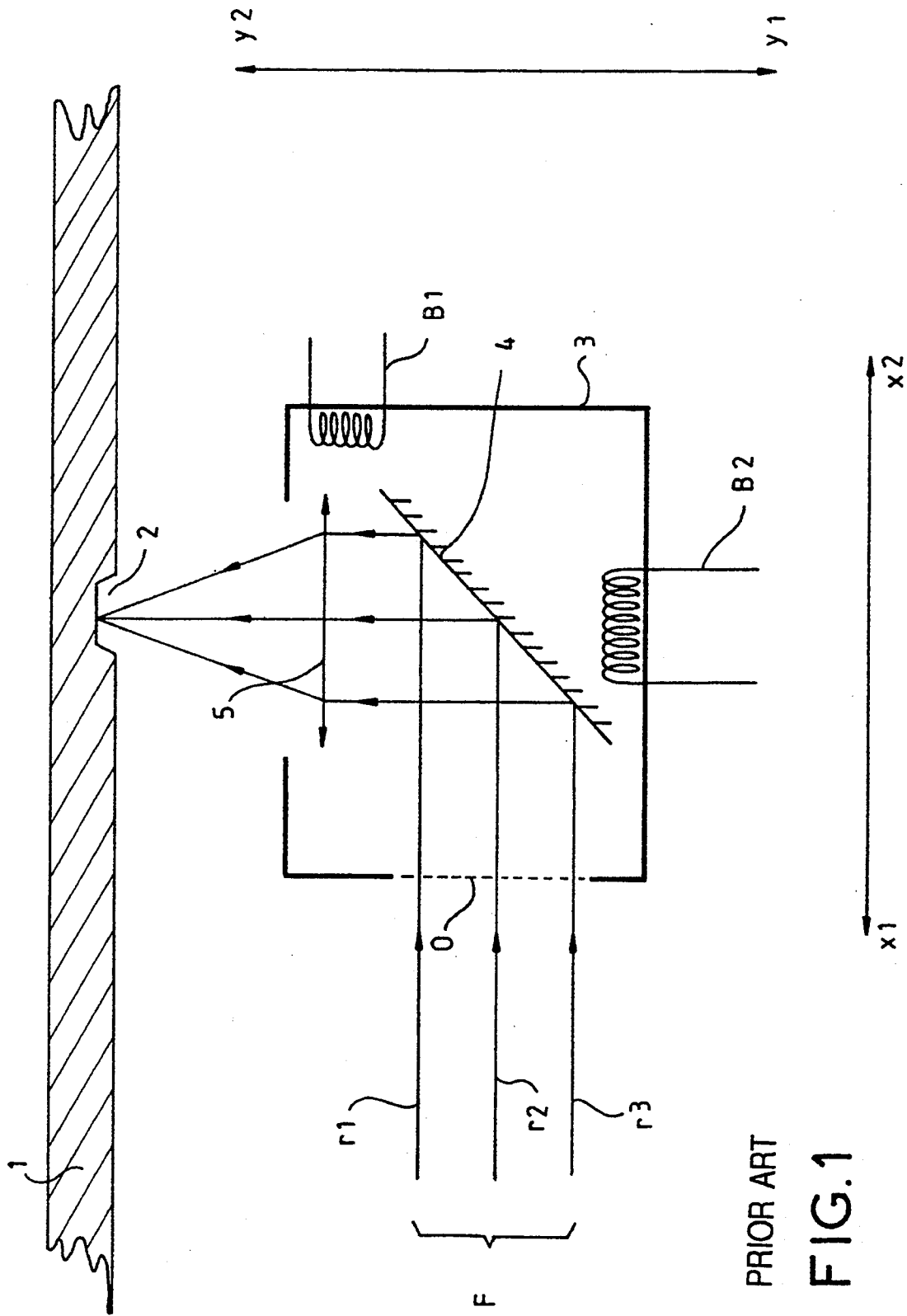
—FIG. 1: a drawing showing the principle of a device for accessing and tracking, according to previous methods.

FIG. 1 represents a sectional view, along a radius of the disk, of a device for accessing and tracking according to previous methods described in French patent N° 89 008800.

As has been previously stated, the data is recorded along tracks in the form of a single spiral or a series of concentric circles.

A track is represented in section, as an example, by the groove 2.

A mobile head including a rigid carriage able to move along the horizontal axis x1 x2, contains a return mirror 4, reflecting the laser beam F towards the mobile media 1, and a lens 5 which enables the laser beam to be focussed at the surface of the disk.

On the figure, the laser beam F is represented by three of its rays: the central ray r2 and the rays r1 and r3 located on the edges of the beam.

The return mirror 4 and the focussing lens 5 are rigidly linked to the access carriage 3, as described in French patent N° 89 08800. The same applies to the motor coil B2 which controls the vertical movements of the lens 5 along the axis y1 y2 and coil B2 which controls the horizontal movements of carriage 3 to ensure access and radial tracking of the beam.

When the mobile head is moved vertically in order to adjust the focussing, a masking of beam F and thus of the pupil of lens 5 can occur since the beam is then no longer correctly centered in relation to the opening O, circular for example, of carriage 3.

In the case of a mobile medium with a very uneven surface, the vertical movement of the mobile head is considerable. The masking of the pupil of the lens can as a consequence become considerable. This is a major disadvantage.

Figure 2:
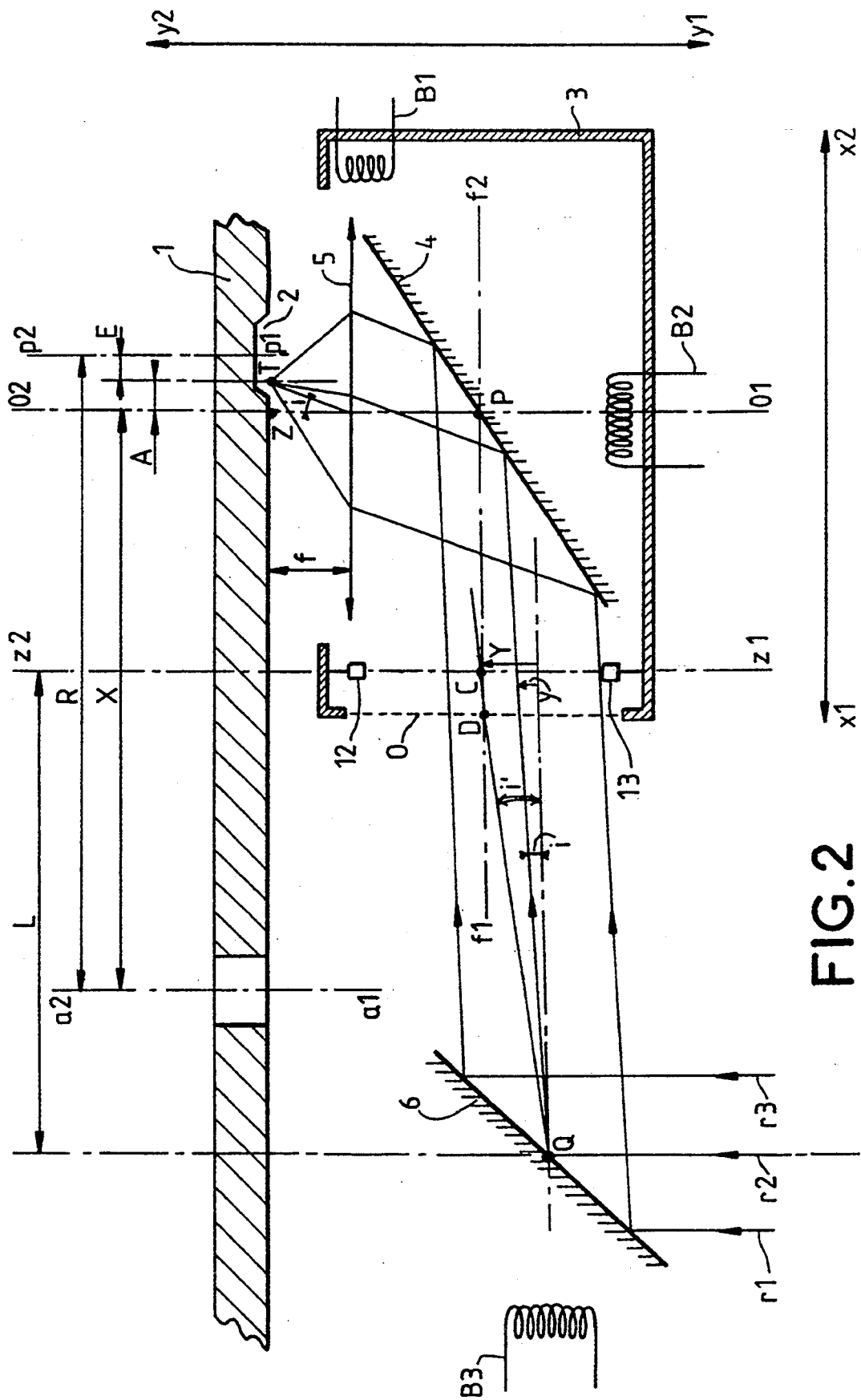
—FIG. 2: a drawing showing the principle of a device for accessing and tracking, according to a preferred embodiment of the invention.

FIG. 2 is a sectional view along a radius of disk 1, of a device for accessing and tracking according to a preferred embodiment of the invention.

A part of the device is similar to what is described in the French patent N° 89 08800: the return mirror 4 and the focussing lens 5 are rigidly linked to the access carriage 3.

Nevertheless, according to the preferred embodiment of the invention, correction of radial tracking is no longer ensured by mirror 4.

This correction is carried out with the help of mirror 6 which pivots, for this purpose, around an axis fixed on the frame of the reader-recorder, perpendicular to the section in FIG. 2 and passing through the center Q of the said mirror.

Mirror 6 is controlled by motor coil B3.

Let f1 f2 be a straight line parallel to the horizontal axis x1 x2 passing through the center P of the mirror 4 and the center D of the opening O of the carriage of the optical head.

When the mobile head is at its nominal position in relation to the frame of the reader-recorder, the straight line linking the points P and Q coincides with the straight line f1 f2. According to the invention, two detection cells 12 and 13 rigidly linked to carriage 3 and placed symmetrically about the straight line f1 f2 on the vertical axis z1 z2 are used to detect any movement of beam F relative to carriage 3 along the vertical direction by interfering with the edges of the said beam.

The decentering of the beam is quantified by parameter V which measures the vertical deviation of the beam in relation to its nominal position.

This quantity V is made up of two terms: y and Y.

The term y measures the displacement corresponding to the angle i between the central ray r2 of the beam F and the horizontal line passing through the point Q. This angle i is due to the use of the mirror 6 as a device for correction of radial tracking.

The angle i is always very small. It can therefore be taken to be equal to its sine or tangent. In FIG. 2, this angle is exaggerated to make it more clearly visible. If L is the distance separating point Q from the vertical axis z1 z2 on which the detection cells are located, we have: $y = L \times i$.

The distance Y is the vertical offset of the mobile head in relation to its nominal position.

This term is related to the angle i' between the horizontal line passing through Q and the line joining Q to the point C located on axis z1 z2 at an equal distance from cells 12 and 13.

For the same reasons as those given above for angle i, we have: $Y = L \times i'$.

The parameters which are involved in the regulation device are as follows:

—radius R, the distance between the axis a1 a2 passing through the center of the disk 1 and the vertical axis p1 p2 passing through the axis of the track defined by groove 2.

—abscissus X which measures the distance between the axis a1 a2 and the axis o1 o2 perpendicular to lens 5 and passing through its center.

—distance A which is the offset on the disk corresponding to angle i, between the center T of the focussing spot and the point Z of intersection of axis o1 o2 with the surface of the disk.

—tracking error E, which is the distance between the center of the spot and the axis p1 p2.

R and X measure distances and are therefore quantities which are always positive. A and E measure offsets in relation to a central position and are therefore positive or negative depending on a sign convention which will not be specified here.

The positions of the detection cells 12 and 13 is an advantageous characteristic of the device because the said cells are sensitive to both vertical focussing displacements and angular movement of mirror 6.

The object of the invention is to correct the possible masking of the pupil of lens 5; it follows from this that detectors 12 and 13 should, theoretically, be located exactly in the plane of the pupil of the lens.

In practice, it is more convenient to position them as is represented in FIG. 2.

However, any other position close to the plane of the pupil enabling the detectors 12 and 13 to detect the light on the edges of the laser beam is acceptable.

Figure 3:
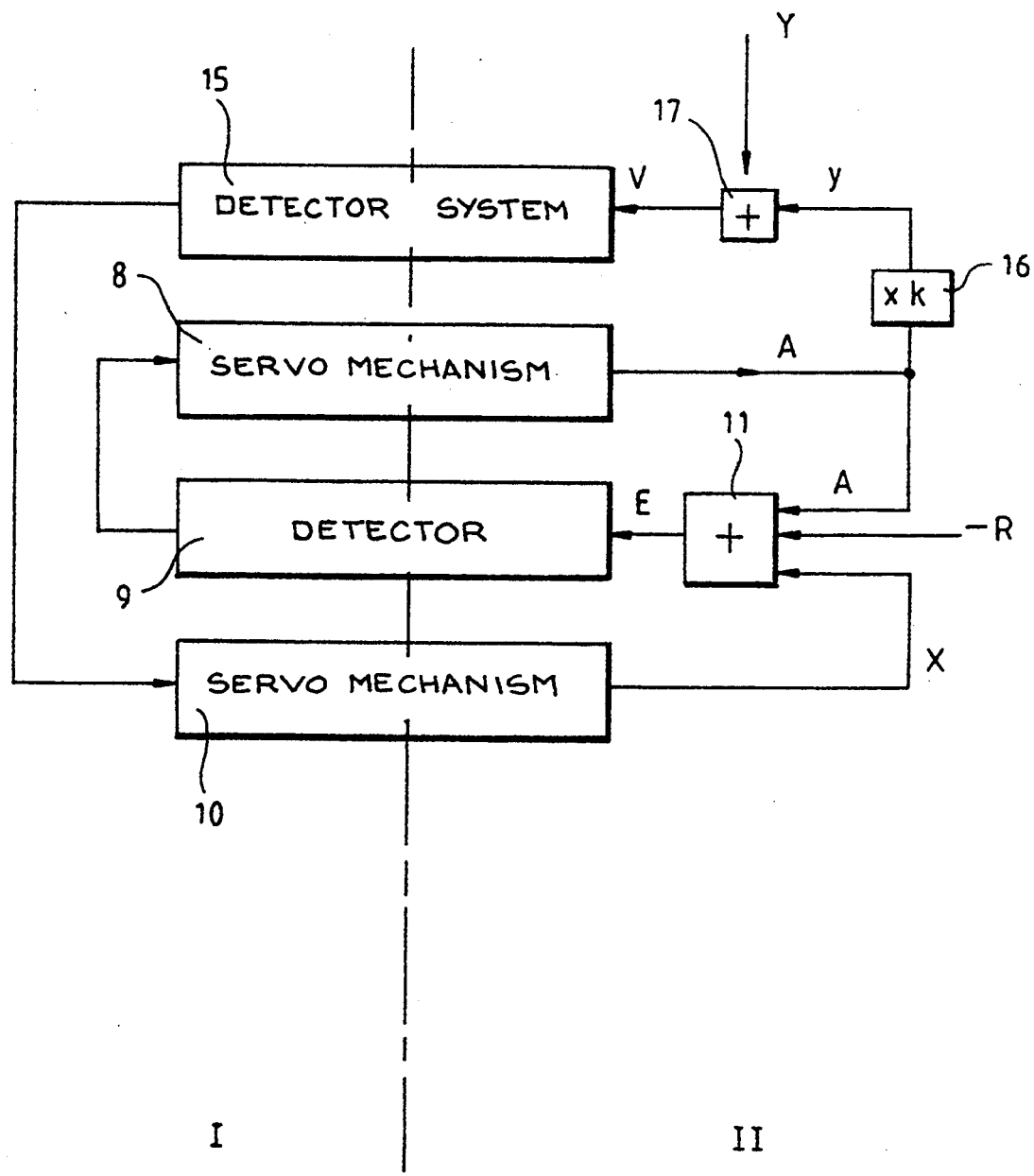
—FIG. 3: is a synoptic, symbolic drawing of the control loops of the device in FIG. 2.

FIG. 3 describes a synoptic, symbolic drawing of the control loops of the device in FIG. 2.

This synoptic drawing is divided into 2 zones I and II. Zone I contains electrical elements and zone II only contains mechanical parameters. Detector 9 transforms the tracking error E into an electrical signal sent into the servomechanism 8 of the motor of the radial mirror; the servomechanism 8, which has a typical cut-off frequency of 3 to 4 kHz, then acts to cancel error E.

Detector 9 symbolizes any means known to specialists which enable the tracking error E to be detected. E is represented symbolically by the input of parameters A, -R and X to an adder circuit 11, which is only the symbolic representation of the symbolic link which exists between variables E, A, -R and X.

Deviation V is represented as the symbolic result of the input of parameters Y and y to the adder circuit 17, which is only the symbolic representation of the symbolic link which exists between variables V, Y and y.

Likewise, the quantity y results from the input of parameters A to multiplier 16 according to the law $y = k \times A$. This relationship is deduced from the two relationships below:

$y = L \times i$ already mentioned above, and $A = f \times i$ by definition of the focal length $f$.

Thus, we have $k = L/f$.

According to the invention, the servomechanism 10 of the linear servo-motor tends to cancel the vertical deviation V whose amplitude and direction are measured by the detector system 15.

The servomechanism 10 cancels out the component y, linked to angle i, which has the effect of bringing back the focussed beam towards the center of the lens' field. At the same time, this servomechanism cancels the component Y which has an opposite effect.

Figure 4A:
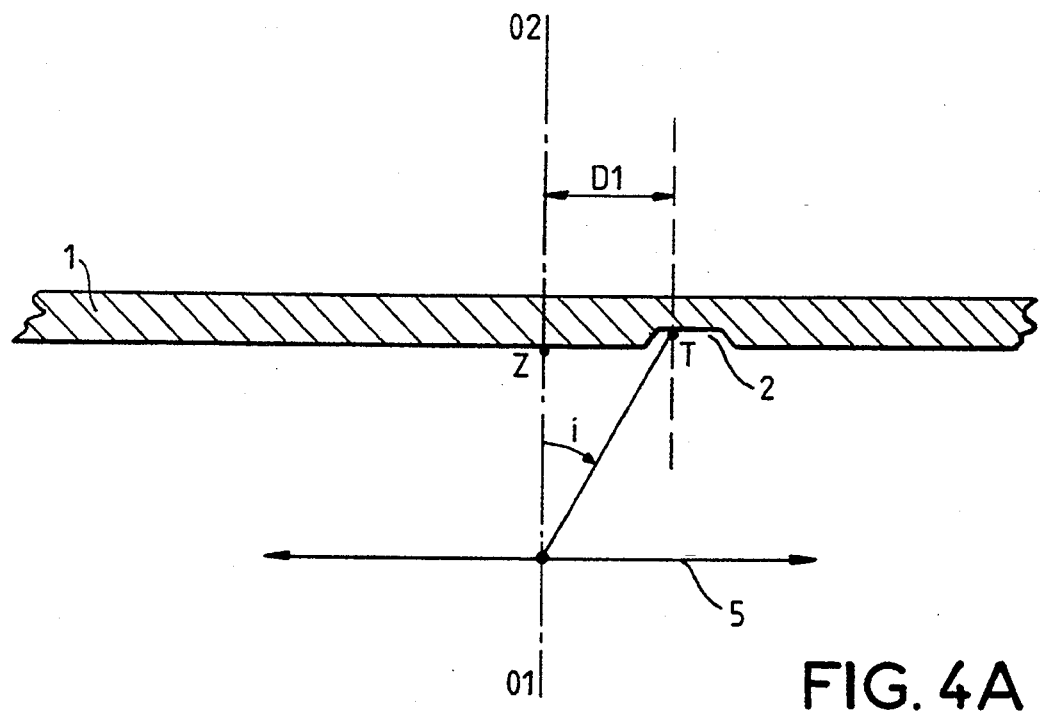
—FIG. 4A: is, as an example, the position taken up by the center T of the focussing spot in the case where the servomechanism according to the invention is not activated.

FIG. 4A is, as an example, the position taken up by the center T of the focussing spot in the case where the servomechanism 10 is not activated. The center T of the focussing spot is at the distance $D1 = \overline{AAA}$ from the point Z (A being an algebraic quantity, distance D1 associated with it is equal to its absolute value).

Figure 4B:
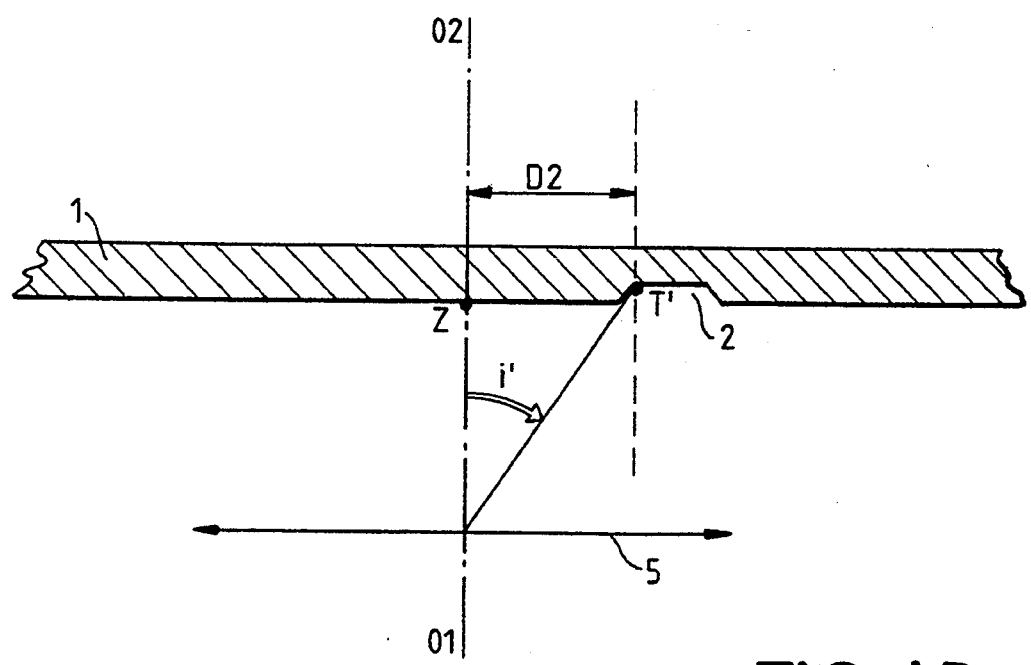
—FIG. 4B: is the position taken up by the center T of the focussing spot in the case where the servomechanism according to the invention is activated.

According to the invention, when the servomechanism 10 is active and receiving data coming from the detector system 15, the center of the focussing spot is at T', at distance $D2 = f \times i'$ from point Z as indicated in FIG. 4B. The correction of the pupil is assured by the linear motor via coil B2. In FIGS. 4A and 4B, distances D1 and D2 can typically contain 10 or 20 tracks. For reasons of clarity, only one track is represented on these figures, and its width has been exaggerated.

If the focal length of the lens is f, we can write:
$D2 = f \times i'$ where $i'$ is the angle previously defined.
It is known that $Y = L \times i'$, so we obtain:
$D2 = (f \times Y)/L$, or $D2 = Y/k$.

If the lens has a focal length of $f = 3.9$ mm and disk 1 has a flatness of 0.3 mm, then $Y = 0.3$ mm. Distance L having a nominal value of 50 mm, the distance D2 can thus be calculated: $D2 = 23$ m.

For a lens with a field diameter of 150 to 300 m, this divergence is quite acceptable while the diaphragm effect of 0.3 mm which existed before correction was detrimental.

The gain of the loop described in FIG. 3 is proportional, as regards the term y, to the distance L between the center Q from mirror 6 used for the correction of radial tracking, and the axis z1 z2 defined by detection cells 12 and 13. An electronic correction can be introduced to keep the gain constant.

Figure 5A:
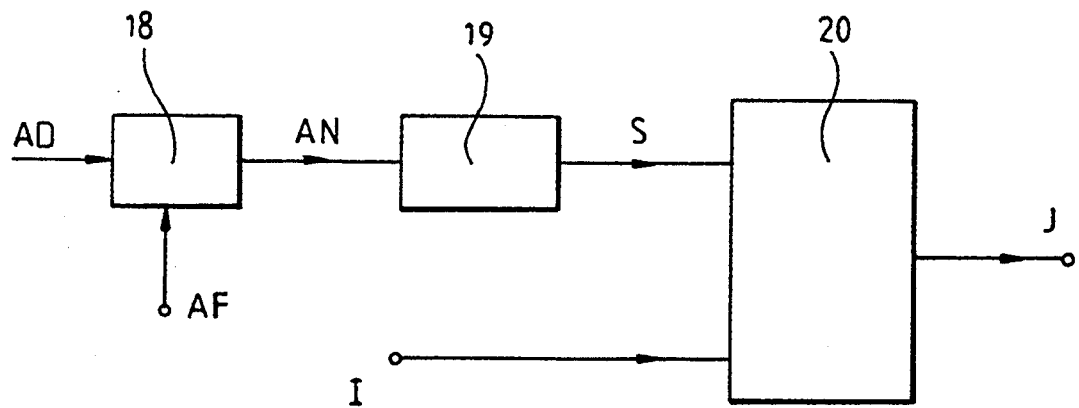
—FIGS. 5A and 5B: are the synoptic drawing of the control circuit of the gain of the analog control loop of the linear servo-motor according to the preferred embodiment of the invention.

This correction can be carried out by using the current address of the mobile head following the principle described in FIG. 5A in the case of a loop of the analog servomechanism of the linear motor.

The current address of the track AD of the mobile head is known at all times, as described in the French Patent N° 85 17560.

A new address AN can be calculated by adding, with the help of circuit 18, a fixed address AF at the current address AD. An analog signal S proportional to L is thus deduced from the address AN with the help of a digital-to-analog converter 19, with a precision of plus or minus one track. This signal S allows an analog divider 20 to be controlled whose input I and output J are linked to the loop of the linear servo-motor as indicated in FIG. 5B in the case of a analog servomechanism loop.

Figure 5B:
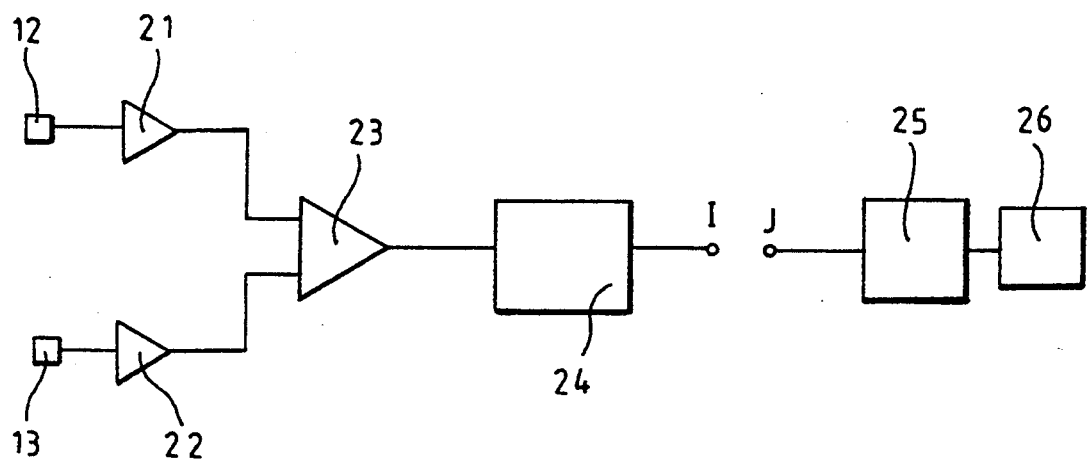

FIG. 5B describes the circuit in which the analog divider 20 is incorporated. The detector cells 12 and 13 are respectively linked to amplifiers 21 and 22. The signals emitted from the said amplifiers are subtracted from each other by the means of circuit 23 whose output signal is then fed to the filtering circuit 24 as is common practice for stabilizing servomechanism loops. The output of the filtering circuit 24 is connected to the input I of the analog divider 20, whose output J is itself connected to the input of a power amplifier 25. The latter is connected to the linear motor 26.

Figure 6:
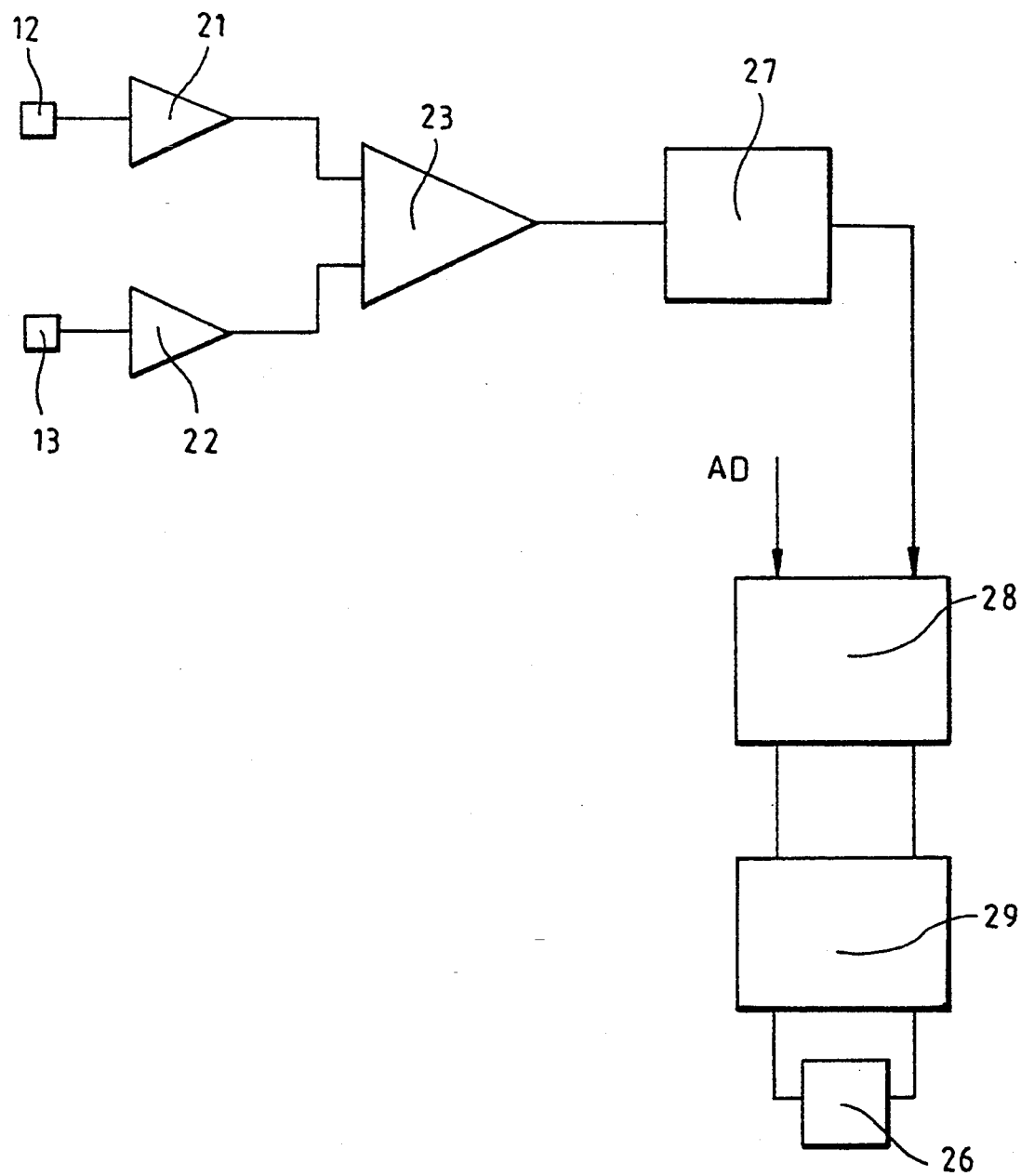
—FIG. 6: is a synoptic drawing of the control circuit of the gain of the digital control loop of the linear servo-motor according to the preferred embodiment of the invention.

FIG. 6 describes how the correction of gain in the case of an entirely digital servomechanism loop is carried out.

Signals detected by cells 12 and 13 are amplified by the respective circuits 21 and 22. The signals obtained are, as previously, subtracted from each other and the signal difference obtained is fed into an analog-to-digital conversion circuit 27. The digital signal obtained as well as the current address of track AD are then fed directly to the micro-processor 28 controlling the servomechanism. The latter then generates, for example, sequences of pulses of constant amplitude and length but at variable intervals. These pulses control a feeding bridge 29 supplying the access motor 26.

According to the preferred embodiment of the invention, mirror 6 fixed to the frame of the reader-recorder ensures correction of the radial tracking under the influence of the motor coil B3. In this embodiment, mirror 6 is highly mobile. The gain of the radial tracking regulation loop is thus very high and can reach for example the value of 1000 at low frequencies. The residual value of the divergence to the track is therefore no more than, after the correction by the servomechanism, a thousandth of what it was previously.

There is also another possible embodiment of the invention.

According to this other possible embodiment, mirror 6 does not ensure the correction of radial tracking but it does ensure the correction of the pupil. The correction of radial tracking is thus assured by mirror 4 moved by the linear servo-motor 10 of the mobile head. The linear servo-motor is fed by track divergence signals E and the difference of the signals emitted by the detector cells 12 and 13 here is fed into coil B3 which controls the rotation of the mirror 6 in order to ensure the correction of the pupil.

Figure 7:
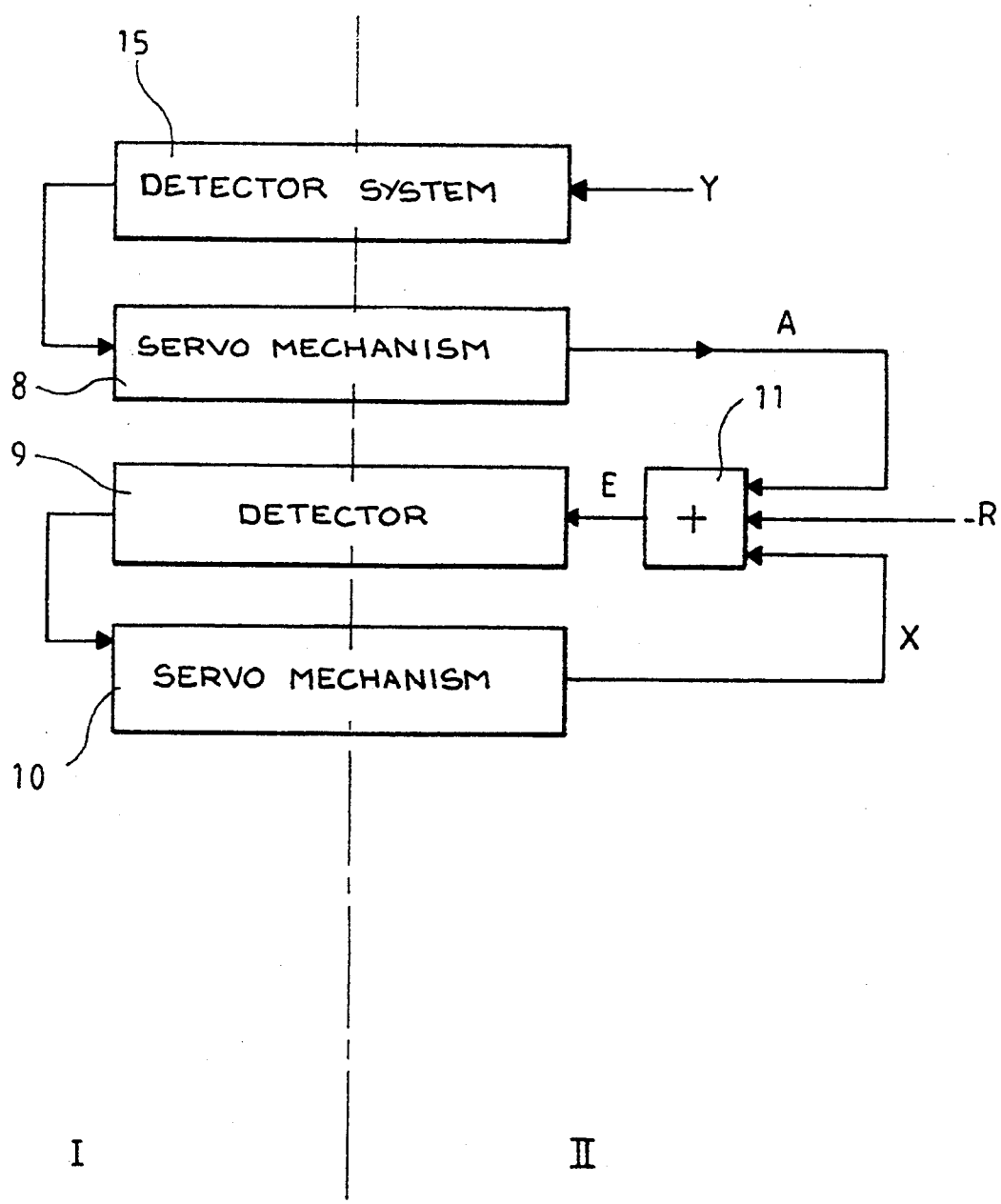
—FIG. 7: is a symbolic synoptic drawing of the control loops of the device in FIG. 2 in the case of a variant of the invention.

The synoptic drawing of the regulation loops of this variant is represented in FIG. 7. The gain of the loop of mirror 6 is low here, for example in the order of 10 at low frequencies, in comparison to that of the linear motor for example of the order of 1000 at low frequencies.

It is also possible here to make the loop gain constant by dividing by a factor proportional to distance L, as described previously. To do so, it is sufficient to replace, in the previous description, the linear motor 26 by coil B3.

What is claimed is:

1. Device for accessing and following tracks on the surface of mobile media containing data optically readable and/or recordable by a laser beam, said device including at least one optical head made up of a rigid carriage which enables the laser beam to access the reading and/or writing track, of a lens rigidly linked to the rigid carriage and intended to focus the laser beam on the surface of the mobile data medium, of a return mirror linked rigidly to the rigid carriage and intended to direct the laser beam towards the lens, of at least one motor coil which allows movements of the carriage intended to focus the laser beam, and a mirror not fixed to the optical head and which allows the laser beam to be directed towards the optical head as well as a motor coil allowing said mirror to pivot, and means for detecting and correcting any decentering of the beam in relation to the axis perpendicular to the plane of the pupil of the lens and passing through its center, the correction being applied along the direction defined by the axis perpendicular to the said axis and contained in the plane perpendicular to the plane of the pupil and containing the center of the return mirror and the center of the mirror which allows the laser beam to be directed towards the optical head.

2. Device according to claim 1 wherein the means for detecting and correcting decentering of the beam include two photoelectric detector cells fixed to the optical head.

3. Device according to claim 2 wherein the two detector cells are placed on an axis perpendicular to the surface of the mobile medium, located between the return mirror and the mirror which allows the beam to be orientated towards the optical head, said axis intercepting the straight line defined by the center of the return mirror and the center of the opening of the optical head, said detector cells being located at equal distances on each side of the point of interception of the said axis and the straight line.

4. Device according to either claim 2 or 3, wherein the means for detecting and correcting any decentering of the beam include first means for amplifying the signal emitted by the first detector cell, second means for amplifying the signal emitted by the second detector cell and additional means to calculate the difference between the signals emitted of said first means and said second means.

5. Device according to claim 4 wherein means are included for connecting the additional means to the motor coil which enables the rigid carriage access to the tracks of the mobile medium.

6. Device according to claim 4, wherein means are included for connecting the additional means to the motor coil which is used to pivot the mirror, enabling the laser beam to be directed towards the optical head.

7. Device according to claim 5 wherein means are included which allow the radial tracking to be assured with the help of the mirror enabling the laser beam to be directed towards the optical head.

8. Device according to claim 6 wherein means are included which allow the radial tracking to be assured with the help of the return mirror.

9. Device according to claim 5, wherein said means include means which make the gain of a regulation loop constant.

10. Device according to claim 9 wherein the means which make the gain of the regulation loop constant include a circuit calculating a new address by adding a fixed address to the current address of the track, a digital-to-analog converter enabling an analog signal to be generated based on the new address and an analog divider controlled by the analog signal.

11. Device according to claim 9 wherein the means which make the gain of the regulation loop constant include an analog-to-digital converter whose input signal is emitted from the means which calculate the difference between the signals from the two photoelectric detector cells and the micro-processor which controls the servomechanism, the said micro-processor receiving as input the signal emitted from the analog-to-digital converter as well as the current address of the track.

12. A device for accessing and following tracks on a surface of a mobile medium containing data optically readable and/or recordable by a laser beam, said device including:
 (a) at least one optical head made up
  of a rigid carriage which enables the laser beam to access the track to be read and/or to be recorded,
  of a lens rigidly linked to the carriage and intended to focus the laser beam on the surface of the mobile data medium,
  of a return mirror linked rigidly to the carriage and intended to direct the laser beam towards the lens,
  of at least one motor coil which allows movements of the carriage intended to focus the laser beam,
 (b) means for detecting any decentering of the laser beam in relation to an axis perpendicular to the plane of the pupil of the lens and passing through its center, and
 (c) means for correcting detected decentering of the laser beam, including a pivotable mirror not fixed to the optical head and which allows the laser beam to be directed towards the optical head, and
 (d) a motor coil allowing said mirror to pivot.

* * * * *